UNITED STATES PATENT OFFICE.

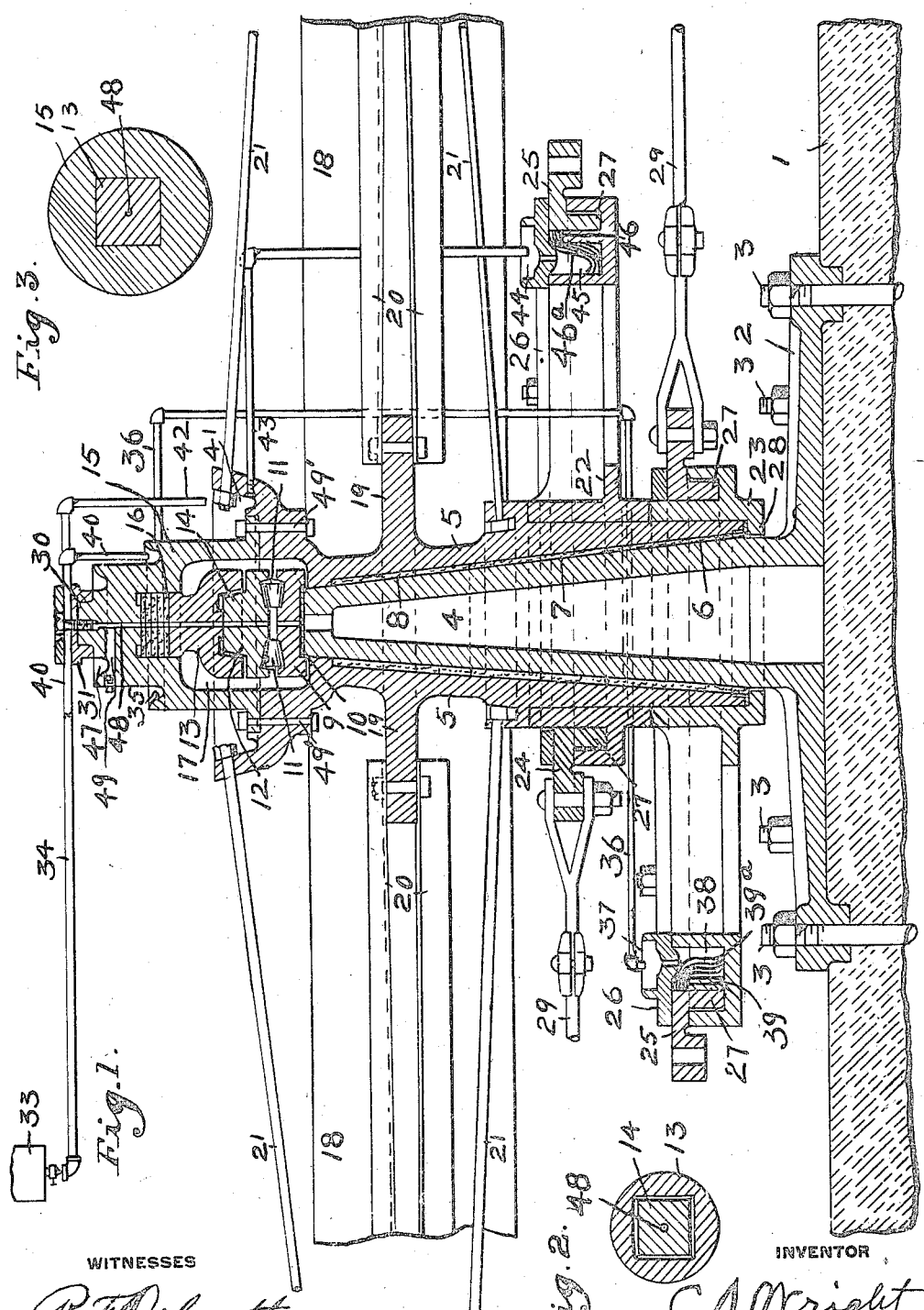

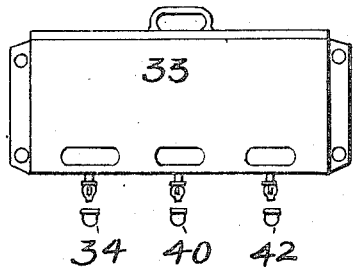
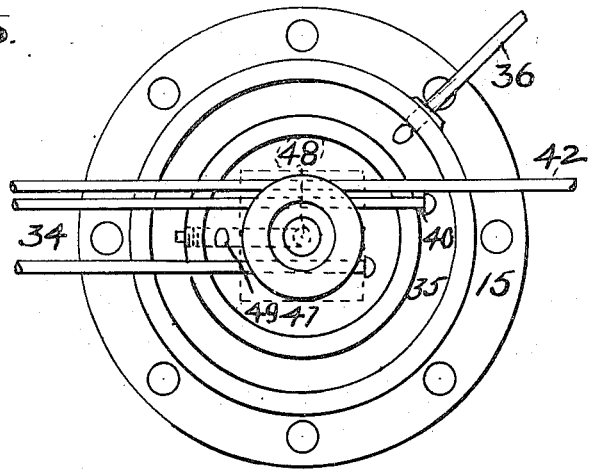
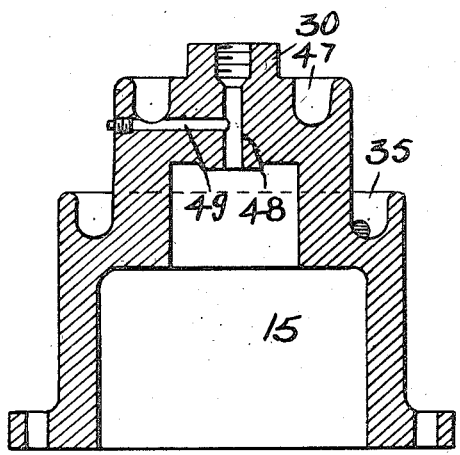

CLYDE S. WRIGHT, OF TOLEDO, OHIO, ASSIGNOR TO THE NATIONAL SUPPLY COMPANY, OF TOLEDO, OHIO, A CORPORATION OF OHIO.

BEARING.

1,138,167.  Specification of Letters Patent.  Patented May 4, 1915.

Application filed November 7, 1913. Serial No. 799,709.

*To all whom it may concern:*

Be it known that I, CLYDE S. WRIGHT, a citizen of the United States, residing at Toledo, in the county of Lucas and State of Ohio, have invented new and useful Improvements in Bearings, of which the following is a specification.

My invention relates to bearings.

The object of my invention is to mount the band-wheel anti-friction devices at the upper side of the same so that they may be readily removed and repaired.

Another object is to allow for side thrust on the roller bearings so that, when the lateral bearings of the band-wheel become unevenly worn, the driver for the upper roller race member may tip sidewise permitting the apparatus still to do its work.

Another object is to provide for taking up wear when the lateral thrust-bearings become worn.

Other minor objects will appear hereinafter.

Referring to the accompanying drawings, Figure 1 shows a vertical central section of an apparatus embodying my invention and Fig. 2 is a horizontal cross-section through the driver 13 for the upper roller race member and the projection 14 on the upper race member. Fig. 3 is a vertical section through the said driver and the hub-cap. Fig. 4 is a side view of the oil tank; Fig. 5, a top view of Fig. 1 with parts below the hub-cap omitted; and Fig. 6, a vertical central section of the hub-cap.

On the drawings, 1 represents the foundation to which the metal base 2 is secured by the bolts 3. The base is provided with a vertical upwardly tapering spindle 4 around which the hub 5 of the band-wheel is placed. The interior of the hub 5 is tapered to correspond with the taper of the spindle 4, there being between the spindle and the hub superposed anti-friction bushings 6, 7, and 8, which are preferably not cast in the position shown, but are made separately and put in place as the apparatus is assembled. The inner surface of the hub 5 is recessed to accommodate the said bushings.

9 is the lower roller bearing race member having its bottom recessed to receive the anti-friction plate 10 which rests upon the upper end of the spindle, the recesses being preferably deep enough to permit the outer part of the race member 9 to overlap the upper end of the spindle for a short distance to prevent the lateral movement of the said race member. The upper face of the race member 9 is grooved to receive the anti-friction cones or rollers 11, on which the upper race member 12 bears.

13 is the driver for the upper race member and has its under face provided with a square recess to receive the correspondingly shaped projection 14 on the upper face of the race member 12. The said projection is slightly tapered upwardly so as to leave a space between the projection and the driver to permit the race member or the driver to tip or tilt slightly to compensate for any irregularity in the wearing of the bearing surfaces beneath the same. The upper end of the recess in the driver has its outer portion recessed or, in other words, its central portion projecting downwardly in order to allow the said upper race member of the driver to tilt as described without resistance.

15 represents the hub-cap which is provided with a lateral flange bolted to a corresponding flange on the upper end of the hub 5. The upper end of the driver is square and extends into a correspondingly shaped recess in the hub-cap, there being a number of liners 16 between the upper end of the driver and the upper end of the said recess in the hub-cap so that some of the liners may be removed from time to time to compensate for wear below the same. The upper end of the hub 5 and the lower end of the hub cap 15 are so shaped internally as to form when they are bolted together an internal cavity 17 for the said anti-friction devices and the driver 13.

18 represents the band-wheel rim connected to the hub-flange 19 by the horizontal arms 20, but I do not limit myself to any particular way of connecting the rim to the hub. 21 represent truss-rods for bracing the horizontal band-wheel. To the lower end of the hub are secured the two eccentrics 22 and 23 provided with the eccentric straps 24 and 25, respectively.

26 represent retaining rings bolted to the eccentrics for holding the eccentric straps in place. The eccentric straps are provided with annular flanges 27 fitting in corresponding grooves in the upper faces of the eccentrics. The lower eccentric 23 is provided with a horizontal flange 28 on its lower end, which serves to support the lower end of the bushing 6. To the outer edge of the eccentric straps are pivotally connected the pull-rods 29 for operating pumps located at a distance or for operating other mechanisms. A large number of pull-rods may be attached to the eccentric straps so that a large number of pumps or other devices may be simultaneously operated. The upper end of the hub-cap 15 is provided with a bearing 30 for the pipe-clamp 31, the upper section being connected thereto by suitable bolts.

33 is an oil-supplying tank which delivers oil to the three pipes 34, 40, and 42. The hub-cap is provided with the inner annular groove 47 into which the pipe 34 delivers oil, which flows from the said groove through the passage 49 in the hub-cap to the vertical passage 48, leading down through the center of the hub-cap, the liners, the upper race-driver, and the two races. The hub-cap has also the annular groove 35 below the groove 47 and with its diameter greater than that of the groove 47. Oil is dropped into the groove 35 by the pipe 40 and conducted out of the groove by the pipe 36 which delivers the oil into the pocket 37 on the retaining ring 26 on the eccentric 25. This pocket has an opening 39 for the wick 39ª which feeds oil to the eccentric strap 27. The hub has the upwardly-open annular groove 41 which receives oil from the pipe 42, the groove 41 being below the groove 35 and having a larger diameter. The oil is conducted from the groove 41 by the pipe 43 to the oil-pocket 44 on the retaining ring on the eccentric 24. From the pocket 44 the oil drops into the chamber 45, from which it is taken up by the wick 46ª into contact with the eccentric strap 27, the wick having a portion in the recess 46.

Whenever it is desired to obtain access to the cavity 17 for renewing the parts or for taking out one of the liners 16, or for supplying a new anti-friction plate 10 or for any other purpose, it is only necessary to remove the bolts 49', when the hub-cap 15 and all parts supported thereby may be lifted away from the hub, leaving the parts within the cavity 17 accessible for any purpose.

I claim—

1. In a band-wheel pumping apparatus, a vertical spindle, a band-wheel hub rotatable thereon, a lower roller race member on the upper end of the spindle, anti-friction rollers on the race member, an upper roller race member on the rollers, a rotatable driver over the upper race member, connections whereby the driver rotates the upper race member and permits the former to tilt, a hub-cap supported by the driver and rigidly connected to the hub, and connections whereby the hub-cap rotates the driver.

2. In a band-wheel pumping apparatus, a vertical spindle, a band-wheel hub rotatable thereon, a lower roller race on the upper end of the spindle, anti-friction rollers on the race, an upper roller race on the rollers, a rotatable driver over the upper race, connections whereby the driver rotates the upper race and permits the former to tilt, a hub-cap supported by the driver and having the hub suspended on the hub-cap, and connections whereby the hub-cap rotates the driver.

3. In a band-wheel pumping apparatus, a vertical spindle, a band-wheel hub rotatable thereon, roller bearings supported by the spindle, a hub-cap lying over the upper end of the roller bearings, and a driver having a pin and socket connection with the hub-cap, there being a loose pin and socket connection between the driver and the upper end of the roller-bearing whereby the latter and the driver may vary their alinement.

4. In a band-wheel pumping apparatus, a vertical upwardly-tapered spindle, a band-wheel hub rotatable thereon and having a corresponding tapered opening for the spindle, roller bearings on the upper end of the spindle, a driver for the roller bearings, a hub-cap lying over the upper end of the driver, an angular pin and slot driving connection between the driver and the cap, and liners between the end of the pin and the base of the socket.

Signed at Toledo, Ohio, this 5th day of November 1913.

CLYDE S. WRIGHT.

Witnesses:
M. N. TABER,
W H. WOLFGANG.